INVENTORS
WILLIAM C. HUNTER, JR.
WILLIAM W. MOWER
GEORGE P. SUTTON
J. PERRY MORRIS
JOHANNES S. NEWTON

BY

William R Lane
ATTORNEY

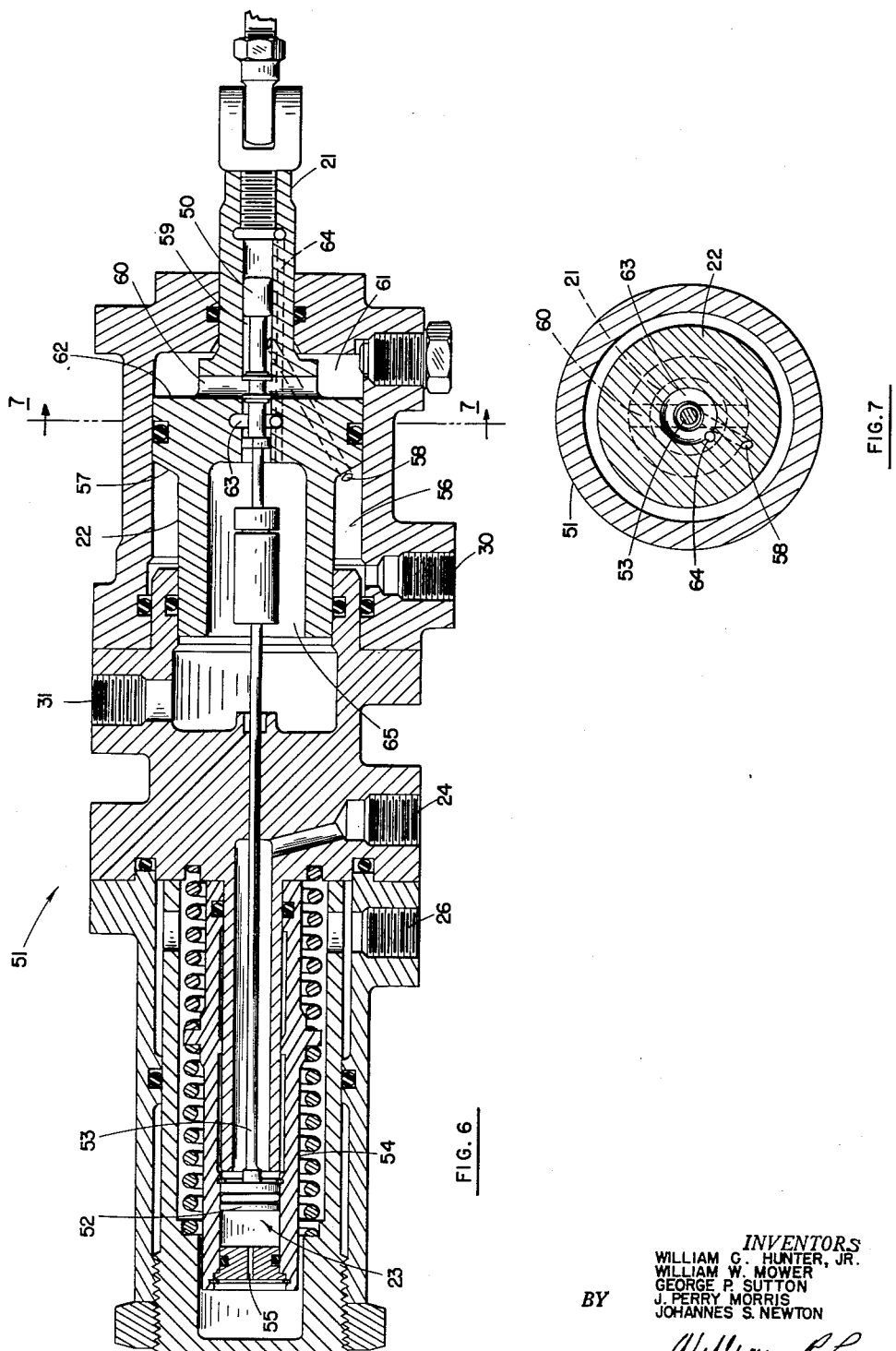

United States Patent Office 2,984,968
Patented May 23, 1961

2,984,968

AUTOMATIC CONTROL OF OXIDIZER AND FUEL TURBOPUMP SYSTEM FOR A ROCKET ENGINE

William C. Hunter, Jr., William W. Mower, and George P. Sutton, Downey, James P. Morris, Long Beach, and Johannes S. Newton, Rivera, Calif., assignors to North American Aviation, Inc.

Filed June 22, 1953, Ser. No. 363,108

4 Claims. (Cl. 60—35.6)

This invention pertains to a means for controlling rocket propulsion systems, and more particularly to a means for controlling the thrust of a rocket engine by controlling the rocket chamber pressure and by controlling the flow of propellants into the combustion chamber of a rocket.

The rocket engines of this invention utilize two propellants, a fuel and an oxidizer, and may have a pump in the fuel line and a pump in the oxidizer line. These main propellant pumps are driven by a prime mover, such as a turbine. The turbine is driven by gases from a gas generator. The gas generator utilizes, to generate its gases, the same fuel and oxidizer which the main rocket engine uses. Either the fuel line or the oxidizer line to the gas generator can be throttled to control the quantity of gas generated in the gas generator, thereby controlling the power supplied to the turbine, the speed of the propellant pumps, and the flow of fuel and oxidizer to the combustion chamber of the rocket engine. The mere throttling of the input lines to the gas generator to control the thrust is not efficient, and either the fuel or oxidizer is wasted. This invention contemplates means for controlling the temperature of gases generated by a gas generator to cause it to operate at its most efficient temperature to accurately control the speed of the turbine, the flow of propellants to the rocket chamber, and hence the thrust of the rocket.

This invention further contemplates a control system wherein the speed of the main propellant pumps is controlled by measuring the pressure in the combustion chamber of the rocket engine and by controlling the flow of gas from the gas generator to the turbine in response to the difference between the chamber pressure and a predetermined controlled pressure.

It is therefore an object of this invention to provide an efficient fast-acting control system for a rocket engine.

It is another object of this invention to provide a temperature control system for a gas generator.

It is another object of this invention to provide apparatus to accurately control the gas pressure within the combustion chamber of a rocket engine.

It is another object of this invention to provide means for accurately controlling the thrust of a rocket engine in a predetermined program.

Other objects of invention will become apparent from the following description taken in connection with the accompanying drawings, in which Fig. 1 is a schematic diagram of a preferred embodiment of this invention;

Fig. 4 is a section view of the orifice in the oxidizer line to the gas generator of Figs. 2 and 3;

Fig. 5 is a section view of the orifice in the fuel line to the gas generator of Figs. 2 and 3;

Fig. 6 is a view of a typical hydraulic throttle actuator of this invention;

Fig. 7 is a view taken at 7—7 in Fig. 6;

Figure 8:
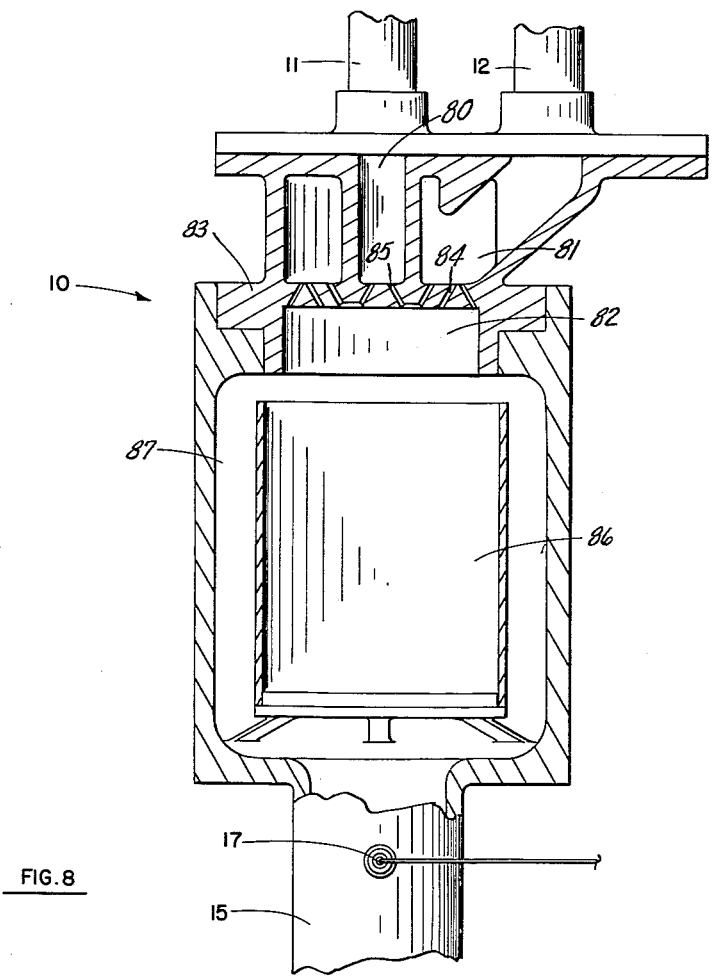

And Fig. 8 is a view, partially in section, of a typical gas generator.

Figure 1:
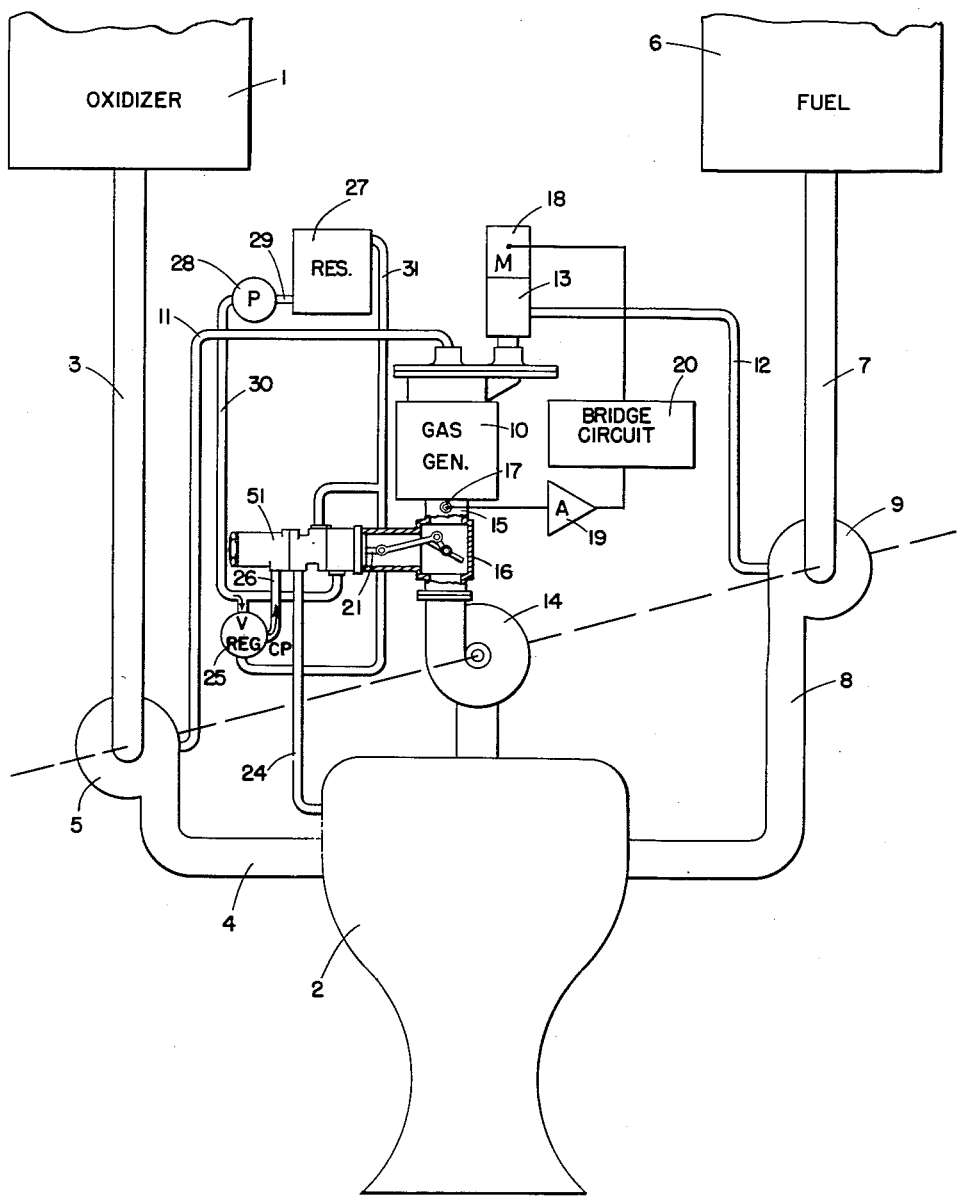

In Fig. 1, oxidizer tank 1 is connected to rocket chamber 2 through pipes 3 and 4 and pump 5. Fuel tank 6 is connected to rocket chamber 2 through pipes 7 and 8 and pump 9. Gas generator 10 is connected to oxidizer tank 1 through pipe 3, pump 5, and pipe 11. Gas generator 10 is connected to fuel tank 6 through pipe 7, pump 9, pipe 12, and valve 13. Gas generator 10 is connected to turbine 14 through pipe 15 and valve 16. Thermocouple 17 is placed within pipe 15 at any place between gas generator 10 and turbine 14. Thermocouple 17 is electrically connected to solenoid or motor 18 through amplifier 19 and bridge circuit 20. Solenoid 18 is mechanically connected to valve 13 to cause valve 13 to vary in accordance with the movement of solenoid 18. Valve 16 is mechanically linked to piston rod 21 which is connected to piston 22, shown more particularly in Fig. 6. Rocket chamber 2 is connected to pilot valve housing 51 by means of pipe 24. Valve 25 is connected to pilot valve housing 51 by pipe 26. Valve 25 is connected to fluid reservoir 27 through pump 28 and pipes 29, 30, and 31. Valve 25 is controlled at a predetermined pressure. Turbine 14 is mechanically connected to drive pumps 5 and 9.

In Figs. 6 and 7, pilot valve 23, slave valve 50, and piston 22 are enclosed in valve housing 51. Inlet port or pipe 24 is pneumatically connected to rocket chamber 2. Inlet port or pipe 26 is hydraulically connected through pressure control valve 25 to hydraulic reservoir 27 and pressure pump 28. The differential pressure across piston 52 positions stem 53. Spring loaded piston 54 has an orifice 55 to prevent surges of hydraulic pressure against piston 52. Stem 53 is connected to drive slave valve 50. Hydraulic fluid under high pressure enters port or pipe 30. The fluid enters annular chamber 56 and bears against surface 57 of piston 22 to cause piston 22 to move to the right. The hydraulic fluid also enters conduit 58 and annular chamber 59. Valve 50 is shown in a balanced position. When the pneumatic pressure in rocket chamber 2 is too high, stem 53 moves to the left, hydraulic fluid enters conduit 60 and annular chamber 61 thereby increasing the hydraulic pressure in chamber 61. Because surface 62 has a larger area than surface 57, piston 22 moves to the left to thereby partially close valve 16, reduce the flow of propellants, and reduce the pneumatic pressure in rocket chamber 2 to balance valves 23 and 50. When the pneumatic pressure in rocket chamber 2 is too low, stem 53 moves to the right, high pressure hydraulic fluid drains from chamber 61 through conduit 60, valve 50, annular chamber 63 and conduit 64 into chamber 65 from whence it returns to reservoir 27 through port or pipe 31. Because of the decrease in pressure on surface 62, piston 22 moves to the right to thereby partially open valve 16, increase the flow of propellants, and increase the pneumatic pressure in rocket chamber 2 to balance valves 23 and 50.

Figure 2:
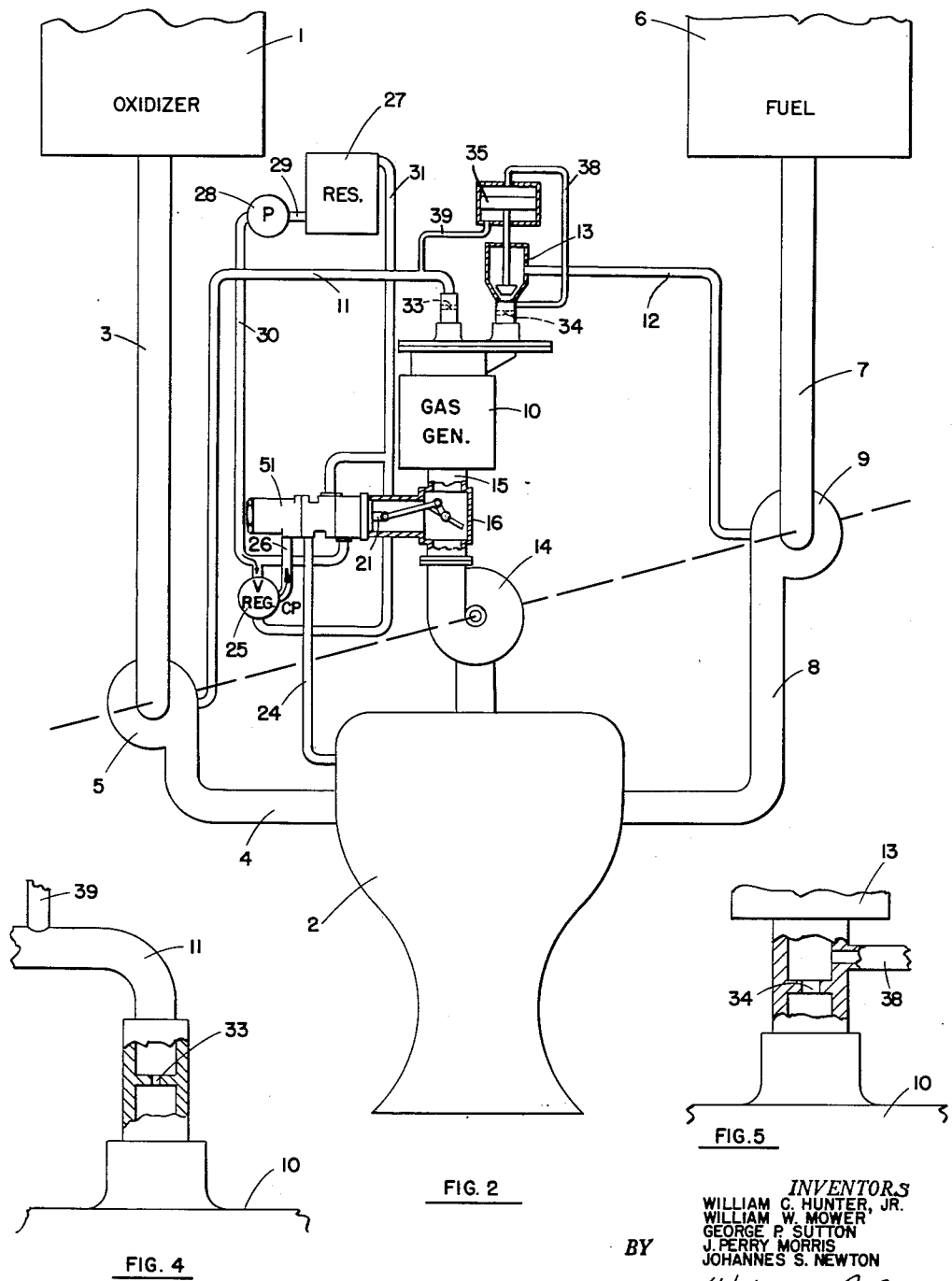
Fig. 2 is a schematic diagram of a second embodiment of this invention.

In Figs. 2, 4, and 5 oxidizer tank 1 is connected to rocket engine 2 through pipes 3 and 4 and pump 5. Fuel tank 6 is connected to rocket engine 2 through pipes 7 and 8 and pump 9. Gas generator 10 is connected to oxidizer tank 1 through pipes 3 and 11, pump 5, and orifice 33. Fuel tank 6 is connected to gas generator 10 through pipes 7 and 12, pump 9, valve 13 and orifice 34. Gas generator 10 is connected to turbine 14 through pipe 15 and valve 16. Valve 16 is connected to be controlled in the same way described in the explanation of Fig. 1. Turbine 14 is mechanically connected to drive pumps 5 and 9. Piston or bellows 35 is mechanically connected to operate valve 13 in accordance with its movement. One side of piston 35 is hydraulically connected by means of tubing 38 to the fuel pipe just upstream from orifice 34. The other side of piston 35 is hydraulically connected by tubing 39 to the oxidizer pipe just upstream from orifice 33. Orifices 33 and 34 are adjusted to size to create the optimum mixture for the most efficient operating temperature of gas generator 10, regardless of the total flow rate. This is accomplished because of the fact that the downstream side of the orifices in gas generator 10 is common to both systems and the pressures upstream of the orifices are controlled to a common value. Thus, it is only necessary to adjust the orifice sizes to give the desired mixture ratio at one flow rate and that mixture ratio will be maintained regardless of the pressure level or total flow rate in the gas generator.

Figure 3:
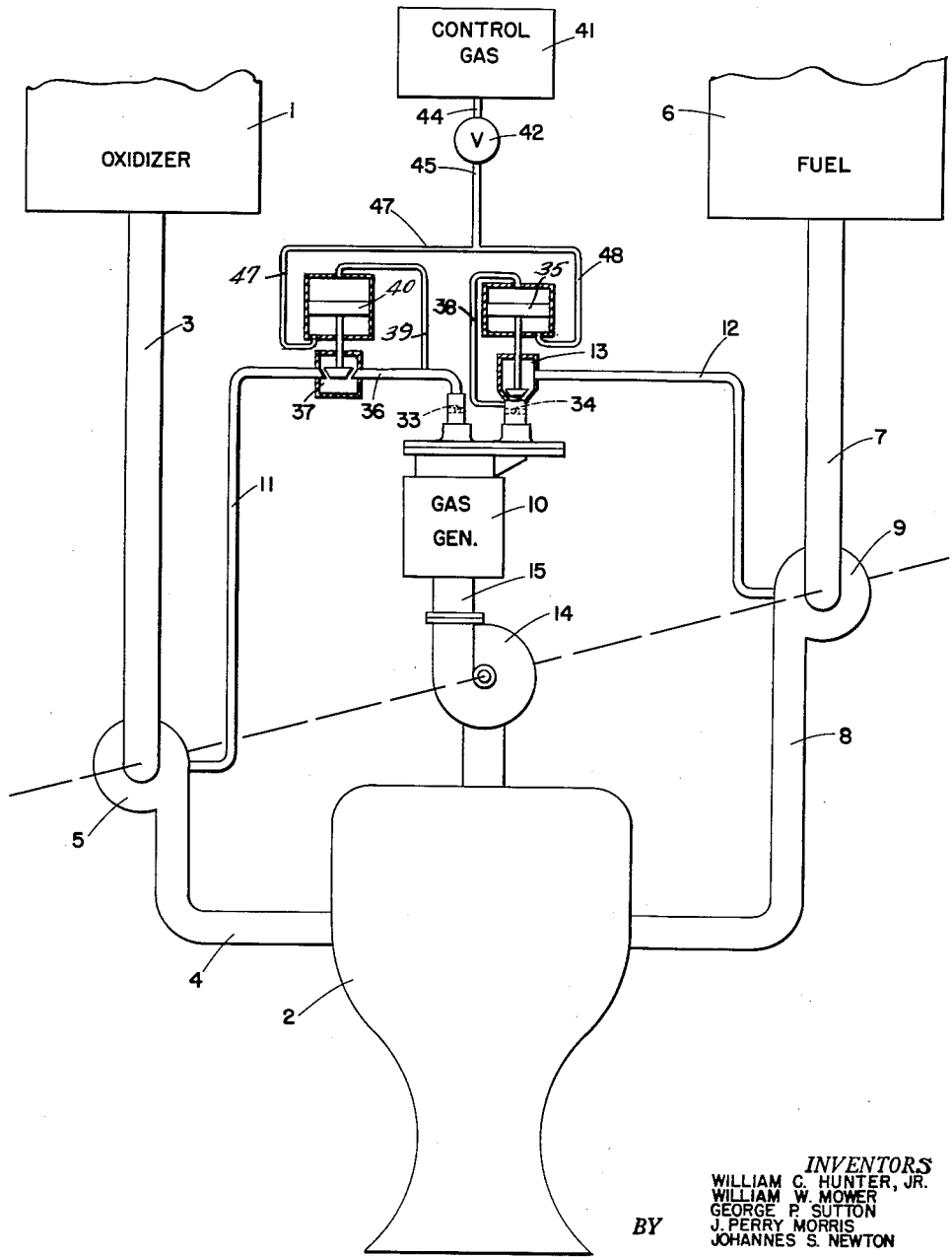
Fig. 3 is a schematic diagram of a third embodiment of this invention.

In Figs. 3, 4, and 5 oxidizer tank 1 is connected to rocket chamber 2 as described for Figs. 1 and 2. Fuel tank 6 is connected to rocket chamber 2 as described for Figs. 1 and 2. Gas generator 10 is connected to oxidizer tank 1 through pipes 3, 11, and 36, pump 5, valve 37, and orifice 33. Fuel tank 6 is connected to gas generator 10 through pipes 7 and 12, pump 9, valve 13, and orifice 34. Gas generator 10 is connected to turbine 14 by pipe 15. Turbine 14 is mechanically connected to drive pumps 5 and 9. Piston or bellows 35 is mechanically connected to valve 13 to cause valve 13 to move with bellows 35. Piston 40 is mechanically connected to valve 37 to cause valve 37 to move with piston 40. One side of piston 35 and one side of piston 40 is pneumatically connected to control gas tank 41 through pressure controller 42, and pipes 44, 45, 47, and 48. The other side of bellows 35 is hydraulically connected by tubing 38 to fuel line 12 just upstream of orifice 34. The other side of bellows 40 is hydraulically connected by tubing 39 to pipe 36 just upstream from orifice 33. Orifices 33 and 34 are adjusted to size to cause gas generator 10 to operate at the proper temperature, by controlling the ratio of the flow of fuel to oxidizer for any amount of total fuel and oxidizer flow into gas generator 10. The total amount of fuel and oxidizer flow is controlled by controlling the gas pressure, regardless of the total flow rate. This is accomplished because of the fact that the downstream side of the orifices in gas generator 10 is common to both systems and the pressure upstream of the orifices are controlled to a common value. Thus, it is only necessary to adjust the orifice sizes to give the desired mixture ratio at one flow rate and that mixture ratio will be maintained regardless of the pressure level or total flow rate in the gas generator. The total flow rate of both propellants into the gas generator is controlled by means of the level of pressure in pressure controller 42.

Gas generator 10 is shown partly in section in Fig. 8. Oxidizer flows from pipe 11 into chamber 80. Fuel flows from pipe 12 into chamber 81. Chamber 81 is of an annular shape. Fuel and oxidizer is injected into chamber 82 by means of injector 83. Fuel flows through injector ports 84. Oxidizer flows through injector ports 85. Injector ports 84 and 85 form a ring about the axis of injector 83. The fuel and oxidizer may be hypergolic or an igniter (not shown) may be needed within chamber 82 to ignite the mixture. The mixture burns in chamber 82 and the gases flow into cylindrical chamber 86. Chamber 86 is closed at the bottom. The gases are directed by injector ports 84 and 85 toward the center of chamber 86, where they strike the bottom and then flow back up the sides into chamber 87. The generator gases then flow from chamber 87 into pipe 15.

In operation, an increase of temperature of the gas in gas generator 10 of Fig. 1 is detected by thermocouple 17 which generates a voltage. The thermocouple voltage is amplified by amplifier 19 and unbalances bridge circuit 20 to cause solenoid 18 to move to partially open or close valve 13 to thereby increase or decrease the flow of oxidizer to generator 10 to change the temperature of the gases generated by gas generator 10 to a predetermined temperature which temperature is controlled by the value of the electrical elements within bridge circuit 20. Thus, gas generator 10, in the embodiment of Fig. 1, operates at a controlled constant temperature. Valve 25 is arranged to cause a particular thrust of rocket engine 2. Pressure regulating valve 25 allows a predetermined (i.e., constant) fluid pressure to appear upon the left side of piston 52, as shown in Figs. 6 and 7, which causes valve 50 to operate to move piston 22 to open valve 16. When valve 16 opens, an increased amount of gas from gas generator 10 impinges upon the blades of turbine 14 and increases the speed of turbine 14 which, because it is mechanically coupled to pumps 5 and 9, increases the speed of pumps 5 and 9. This increases the flow of fuel and oxidizer into the combustion chamber of rocket engine 2 which causes gas pressure within the combustion chamber to increase. The increased gas pressure within the combustion chamber of rocket engine 2 causes the pressure within pipe 24 against the right side of piston 52 in Fig. 6 to increase, thereby pushing piston 52 to the left against fluid pressure from valve 25. This partially closes valve 16. For any given pressure setting of valve 25, valve 16 takes up an equilibrium position which causes the pressure within the combustion chamber of rocket engine to assume a predetermined value. The thrust of rocket engine 2 is determined by the pressure within its combustion chamber. Therefore, valve 25 controls the thrust of rocket engine 2 while gas generator 10 simultaneously operates at its most efficient temperature. Thus, means are provided by this invention to serve the rocket chamber pressure to a predetermined controlled value.

Valve 16 in Fig. 2 controls the thrust of rocket engine 2 in the same manner as described above for the embodiment shown in Fig. 1. In Fig. 2 the temperature within gas generator 10 is assumed to be constant when there is a given ratio of quantity of flow of fuel to quantity of flow of oxidizer. Orifices 33 and 34 are adjusted to size to cause piston 35 to be positioned in a stable position when the ratio of the flow of fuel to the flow of oxidizer is at a predetermined value. Thus, the temperature within gas generator 10 is controlled to be substantially constant at all times at some predetermined value.

In Fig. 3 pressure regulator 42 increases the pressure in bellows or pistons 35 and 40 to cause the thrust from engine 2 to increase. Regulator 42 releases gas to pistons 35 and 40 which loads these pistons at the predetermined pressure of regulator 42. Orifices 33 and 34 are adjusted to size to cause the ratio of the flow of fuel to the flow of oxidizer to be the same regardless of the total flow rate. This is accomplished because of the fact that the downstream side of the orifices in gas generator 10 is common to both systems and the pressure upstream of the orifices are controlled to a common value. Thus, it is only necessary to adjust the orifice sizes to give the desired mixture ratio at one flow rate and that mixture ratio will be maintained regardless of the pressure level or total flow rate in the gas generator. The total flow rate of both propellants into the gas generator is controlled by means of the level of pressure in pressure controller 42. The ratio of the quantity of flow of fuel to the quantity of flow of oxidizer is predetermined to cause the most efficient temperature within gas generator 10. The entire output of gas generator 10 is applied to turbine 14. Any increase of pressure of regulator 42 causes bellows 35 and 40 to move, thereby moving valves 13 and 37 to increase the flow of fuel and oxidizer into gas generator 10 to increase the flow of gas generated by gas generator 10 flowing into turbine 14 which, because turbine 14 is mechanically connected to drive pumps 5 and 9, increases the flow of fuel and oxidizer into the combustion chamber of rocket engine 2, and thereby increases the thrust of rocket engine 2.

In the preferred embodiments shown in Figs. 1 and 2, the gas generator normally runs fuel rich as a safety precaution. It is to be understood that the generator could run oxidizer rich, in which event control valve 13 would be placed in the oxidizer line rather than the fuel line.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for controlling the thrust of a rocket engine having oxidizer and fuel lines leading to a combustion chamber in said engine, comprising pumps within said oxidizer and fuel lines, a turbine connected to drive said pumps, gas generating means for driving said turbine at variable speeds, said turbine connected between said gas generating means and said combustion chamber, valve means controlling the flow of gas from said gas generator means to said turbine, pneumatic pressure detecting means within said combustion chamber, and servo means connected between said valve means and said pneumatic pressure sensing means whereby the combustion chamber pressure of said rocket engine is controlled at a predetermined value by said servo means.

2. Means for controlling the thrust of a rocket engine which has fuel and oxidizer tanks with fuel and oxidizer therein comprising fuel conduit means between a combustion chamber of said rocket engine and said fuel tank, oxidizer conduit means between said oxidizer tank and said combustion chamber, fuel pump means in said fuel conduit means, oxidizer pump means in said oxidizer conduit means, gas turbine means mechanically connected to each of said pump means to drive said pump means, gas generator means connected to said oxidizer pump means and to said fuel pump means to receive oxidizer and fuel therefrom, said gas generator means being connected to said turbine means to drive said turbine means by means of the gases generated in said gas generator means, first valve means connected between said gas generator means and said turbine means, pneumatic pressure sensing means connected into said rocket chamber to measure the pressure therein, servo means connected between said pressure sensing means and said valve means said servo means including a servo motor and a second valve means connected to said servo motor to allow the supply of a predetermined pressure thereto proportional to the desired combustion chamber pressure whereby said first valve means is controlled by said servo motor in accordance with the difference between said desired chamber pressure and said actual chamber pressure to vary the speed of said turbine means and each of said pump means to thereby maintain the pressure within said combustion chamber at a predetermined value.

3. Means for controlling a rocket propulsion system having a rocket engine, a fuel tank containing fuel, a fuel pipe between said fuel tank and the combustion chamber of said engine, a fuel pump in said fuel pipe, an oxidizer tank, an oxidizer pipe between said oxidizer tank and said combustion chamber, an oxidizer pump connected into said oxidizer pipe, a turbine mechanically connected to said pumps to drive them and conduit means to pneumatically connect said gas generator and said turbine to supply gas for driving said turbine, comprising temperature measuring means within said conduit means, a fuel line connected between said fuel pump and the input to said gas generator, an oxidizer line connected between said oxidizer pump and the input to said gas generator, a first valve having a variable opening within said line from said fuel pump, electrical actuating means mechanically connected to said first valve, amplifying means electrically connected between said temperature measuring means and said first electrical actuating means to control said valve and cause the flow of fuel into said gas generator to vary, to cause the temperature at said temperature measuring means to be maintained constant, a second valve connected into said conduit means, valve actuating means connected to operate said second valve, a third valve connected to said second-named actuating means for allowing a predetermined fluid pressure therein, pneumatic pressure sensing means connected into said combustion chamber to detect the gas pressure therein, said pneumatic pressure sensing means being connected to said second-named actuating means to compare said pneumatic pressure with said fluid pressure and to cause said second valve to operate in accordance with the difference in pressure between said pneumatic pressure and said fluid pressure to cause said turbine and pumps to vary in speed and to change the flow of fuel and oxidizer into said combustion chamber to cause said pneumatic pressure to remain constant at a predetermined value which depends upon said fluid pressure whereby an efficient propulsion control is achieved.

4. Pressure control means for controlling the pneumatic pressure within a combustion chamber of a rocket engine which is connected by conduit and pump means to a fuel tank having fuel therein and by conduit and pump means to an oxidizer tank having oxidizer therein, and which has a gas generator connected by pipe means to a turbine which is mechanically connected to said pump means to drive said pump means and control the flow of fuel and oxidizer into said combustion chamber, comprising a first valve in said pipe means, actuating means connected to control said first valve, a second valve for allowing a predetermined control force in said actuating means, pneumatic pressure sensing means connected to said combustion chamber, and said pneumatic pressure sensing means being connected to said actuating means to compare the force of said pneumatic pressure with said predetermined force to operate said actuating means in response to the difference between the force of said pneumatic pressure sensing means and said predetermined force whereby said actuating means operates to control said valve which controls the flow of gas to said turbine, controls the power transmitted from said turbine to said pumps, controls the flow of fuel and oxidizer to said combustion chamber, and causes said pressure to change in a direction which causes said combustion chamber pressure to remain substantially at a predetermined value.

References Cited in the file of this patent

UNITED STATES PATENTS

| | | |
|---|---|---|
| 2,229,805 | Graves | Jan. 28, 1941 |
| 2,336,052 | Anderson et al. | Dec. 7, 1943 |
| 2,397,657 | Goddard | Apr. 2, 1946 |
| 2,531,761 | Zucrow | Nov. 28, 1950 |
| 2,536,601 | Goddard | Jan. 2, 1951 |
| 2,620,628 | Ray | Dec. 9, 1952 |
| 2,635,425 | Thorpe et al. | Apr. 21, 1953 |
| 2,672,731 | Ashton | Mar. 23, 1954 |
| 2,699,037 | Davies et al. | Jan. 11, 1955 |
| 2,754,655 | Holzwarth | July 17, 1956 |
| 2,816,417 | Bloomberg | Dec. 17, 1957 |